United States Patent
Huang

(10) Patent No.: US 9,716,775 B2
(45) Date of Patent: Jul. 25, 2017

(54) SERVER AND AUTHENTICATION METHOD BASED ON A TIME STAMP

(71) Applicants: AMBIT MICROSYSTEMS (SHANGHAI) LTD., Shanghai (CN); HON HAI PRECISION INDUSTRY CO., LTD., New Taipei (TW)

(72) Inventor: Chuan-Che Huang, New Taipei (TW)

(73) Assignees: AMBIT MICROSYSTEMS (SHANGHAI) LTD., Shanghai (CN); HON HAI PRECISION INDUSTRY CO., LTD., New Taipei (TW)

( * ) Notice: Subject to any disclaimer, the term of this patent is extended or adjusted under 35 U.S.C. 154(b) by 37 days.

(21) Appl. No.: 14/859,554

(22) Filed: Sep. 21, 2015

(65) Prior Publication Data
US 2017/0034134 A1 Feb. 2, 2017

(30) Foreign Application Priority Data
Jul. 29, 2015 (TW) .............................. 104124600 A

(51) Int. Cl.
H04L 29/06 (2006.01)
(52) U.S. Cl.
CPC .......... H04L 67/42 (2013.01); H04L 63/0442 (2013.01); H04L 63/068 (2013.01); H04L 63/12 (2013.01)
(58) Field of Classification Search
CPC ... H04L 63/0428; H04L 63/061; H04L 67/42; H04L 63/0442; H04L 63/068; H04L 63/12
See application file for complete search history.

(56) References Cited

U.S. PATENT DOCUMENTS

| 6,704,789 B1* | 3/2004 | Ala-Laurila ...... H04L 29/12009 709/230 |
| 7,447,184 B1 | 11/2008 | Kharvandikar et al. |
| 9,124,585 B1* | 9/2015 | Yen .......................... H04L 61/10 |
| 2006/0010245 A1* | 1/2006 | Carnahan .......... H04L 29/06027 709/231 |
| 2006/0031921 A1* | 2/2006 | Danforth ................. H04L 63/10 726/1 |

(Continued)

FOREIGN PATENT DOCUMENTS

TW 200505200 A 2/2005

OTHER PUBLICATIONS

Perkins, Charles. IP mobility support for IPv4. No. RFC 3344. 2002.*

(Continued)

Primary Examiner — Chau Le
Assistant Examiner — Muhammad Chaudhry
(74) Attorney, Agent, or Firm — Steven Reiss

(57) ABSTRACT

An authentication method based on a time stamp is executed by at least one processor of a server. At least two force renew messages are generated in turn when a configuration of Dynamic Host Configuration Protocol (DHCP) of the server is changed. The at least two force renew messages are encrypted asymmetrically with a private key of the server. The encrypted force renew messages are sent to a client according to a generating order of the force renew messages. A reply message is sent to the client when receiving a renew message from the client.

6 Claims, 2 Drawing Sheets

(56) References Cited

U.S. PATENT DOCUMENTS

| | | | |
|---|---|---|---|
| 2007/0110048 A1* | 5/2007 | Voit | H04L 12/4633 370/389 |
| 2008/0028225 A1* | 1/2008 | Eckert | H04L 63/0869 713/182 |
| 2010/0017597 A1* | 1/2010 | Chandwani | H04L 29/1232 713/156 |
| 2011/0154440 A1* | 6/2011 | De Graaf | H04L 61/2015 726/3 |

OTHER PUBLICATIONS

Jiang, Sheng, and Sean Shen. "Secure DHCPv6 Using CGAs." Work in Progress (2012).*
Das, Subir, et al. "IDMP: an intradomain mobility management protocol for next-generation wireless networks." IEEE Wireless Communications 9.3 (2002): 38.*
Droms, Ralph, and William Arbaugh. Authentication for DHCP messages. No. RFC 3118. 2001.*
Shankar, Narendar, et al. "A transparent key management scheme for wireless LANs using DHCP.", Retrieved from http://www.hpl.hp.com/techreports/2001/HPL-2001-227.pdf , HP Laboratories, Palo Alto (2001).*

* cited by examiner

SERVER AND AUTHENTICATION METHOD BASED ON A TIME STAMP

CROSS-REFERENCE TO RELATED APPLICATIONS

This application claims priority to Taiwan Patent Application No. 104124600 filed on Jul. 29, 2015, the contents of which are incorporated by reference herein.

FIELD

The subject matter herein generally relates to authentication technology, and particularly to an authentication method based on a time stamp and a server.

BACKGROUND

When a configuration of Dynamic Host Configuration Protocol (DHCP) of a server is changed, the server will send a force renew message to inform at least one client which is connected with the server to renew the configuration of DHCP. When the at least one client receives a force renew message from a server, the client will send a renew message to request new configuration from the server which sends the force renew message without any authentication of determining whether the force renew message is received from a false server.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
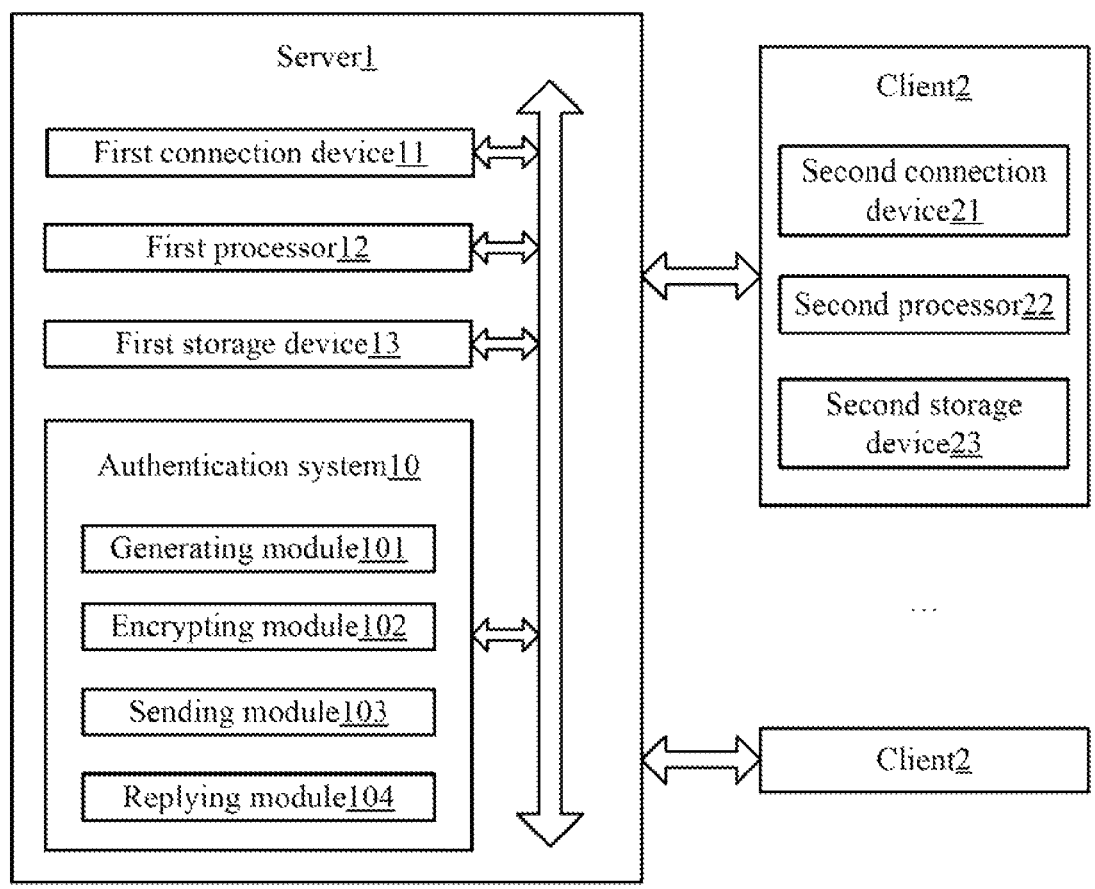
FIG. 1 is a block diagram of one example embodiment of an authentication system based on a time stamp.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The present disclosure, including the accompanying drawings, is illustrated by way of examples and not by way of limitation. It should be noted that references to "an" or "one" embodiment in this disclosure are not necessarily to the same embodiment, and such references mean "at least one".

The term "module", as used herein, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series and the like.

FIG. 1 is a block diagram of one example embodiment of an authentication system based on a time stamp. The authentication system 10 based on a time stamp is executed in a server 1 which is connected with at least one client 2 (FIG. 1 shows only one). The server 1 includes a first connection device 11. The client 2 includes a second connection device 21. The server 1 can connect with the client 2 through the first connection device 11 and the second connection device 21. The first connection device 11 and the second connection device 21 can be, but are not limited to, Wireless Fidelity devices, wireless adapters, or other wireless communication devices. The server 1 is a server which is configured with Dynamic Host Configuration Protocol. The client 2 is a mobile phone, a tablet computer, a router or any other suitable device which is configured with Dynamic Host Configuration Protocol (DHCP).

The server 1 also includes, but is not limited to, a first processor 12 and a first storage device 13. The client 2 also includes, but is not limited to, a second processor 22 and a second storage device 23. The first processor 12 and the second processor 22 can be central processing units (CPU), microprocessors, or other data processor chips that perform functions. The first storage device 13 and the second storage device 23 can include various type(s) of non-transitory computer-readable storage medium. For example, the first storage device 13 and the second storage device 23 can be internal storage systems, such as flash memories, random access memories (RAM) for temporary storage of information, and/or read-only memories (ROM) for permanent storage of information. The first storage device 13 and the second storage device 23 can also be external storage systems, such as hard disks, storage cards, or data storage mediums.

Figure 2:
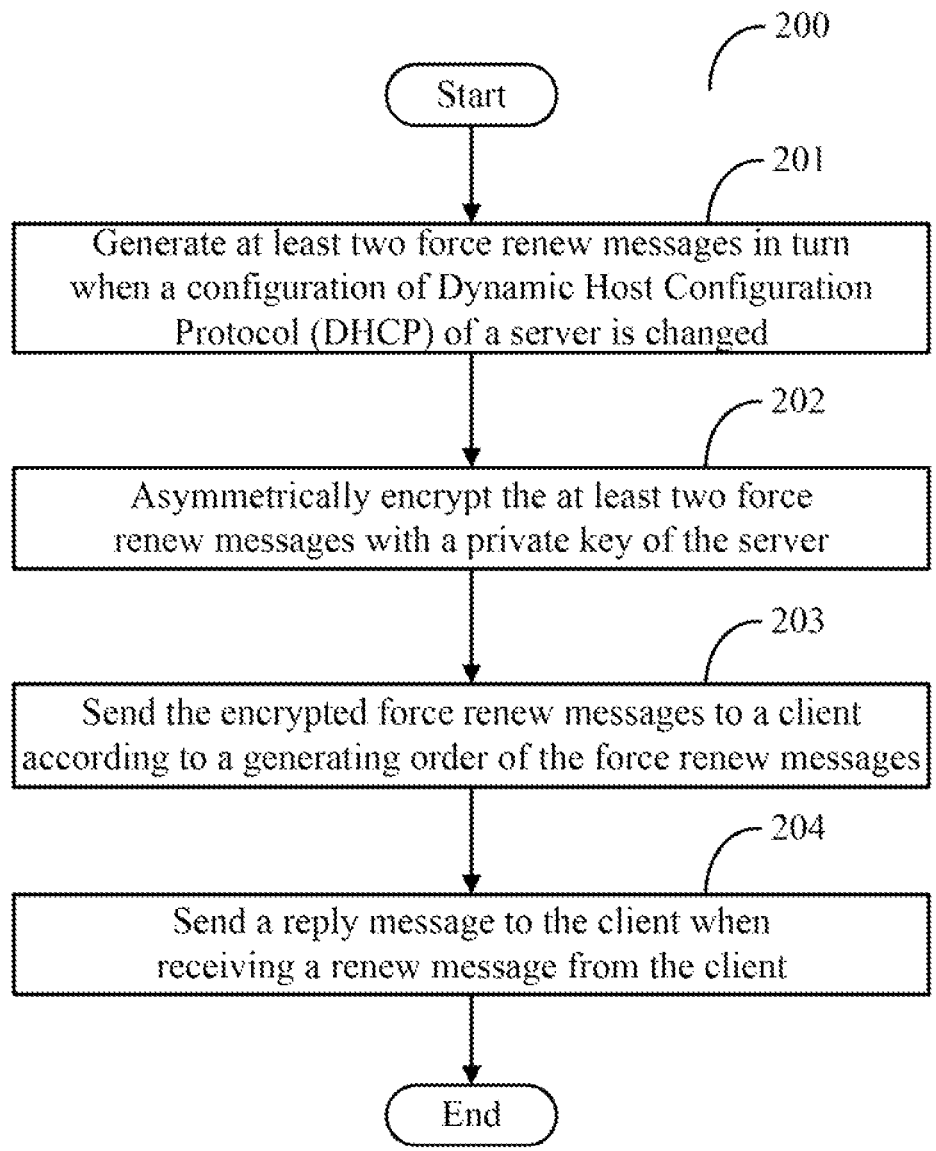
FIG. 2 is a flowchart of one example embodiment of an authentication method based on a time stamp.

FIG. 2 illustrates in at least one embodiment, the authentication system 10 based on a time stamp can include a generating module 101, an encryption module 102, a sending module 103, and a replying module 104. The modules 101-104 can include computerized codes in the form of one or more programs, which are stored in the first storage device 13. The first processor 12 executes the computerized codes to provide the authentication system 10.

The generating module 101 can generate at least two force renew messages in turn when a configuration of Dynamic Host Configuration Protocol (DHCP) of the server 1 is changed. The force renew message includes a time stamp, a time difference, and an identification code of the server 1. The time stamp of a force renew message is equal to a time stamp of a previous force renew message plus the time difference of the previous force renew message. For example, the time stamp of a first force renew message is 10000, the time difference of the first force renew message is 20. The time stamp of the second force renew message is 10000+20=10020.

In some embodiments, the time difference of each force renew message is not a fixed value. For example, the generating module 101 randomly chooses an integer from a range as the time difference of a force renew message. In other embodiments, the time difference of each force renew message can be a fixed value.

The encryption module 102 can asymmetrically encrypt the at least two force renew messages with a private key of the server 1. The private key is stored in the first storage device 13 of the server 1.

The sending module 103 can send the encrypted force renew messages to a client 2 according to a generating order of the force renew messages. In at least one embodiment, the sending module 103 sends the encrypted force renew messages at a regular time intervals (such as 100 ms) until receiving a renew message from the client 2.

In the illustrated embodiment, the generating module 101 generates two force renew messages the first time. The encryption module 102 asymmetrically encrypts the two force renew messages with the private key of the server 1. Then the sending module 103 sends the two encrypted force renew messages to the client 2 according to the generating order. If the server 1 does not receive a renew message from the client 2 within a period time (such as 80 ms, the regular time interval is 100 ms) since the second force renew message is sent, the generating module 101 generates a third force renew message. The encryption module 102 asymmetrically encrypts the third force renew message with the private key of the server 1. Then the sending module 103 sends the third force renew message to the client 2 at the regular time intervals.

When at least two force renew messages are received consecutively from a server, the client 2 determines whether the at least two force renew messages are sent by a false server according to the at least two force renew messages. If the server which sends the at least two force renew messages is not a false server, the client 2 sends a renew message to the server.

The client 2 asymmetrically decrypts the at least two force renew messages with a public key corresponding to the private key of the server 1. If the at least two force renew messages can be decrypted with the public key, the client 2 determines whether the time stamp of the force renew message received later is equal to the time stamp of the other force renew message received earlier plus the time difference of the other force renew message received earlier. If the time stamp of the force renew message received later is equal to the time stamp of the other force renew message received earlier plus the time difference of the other force renew message received earlier, the client 2 determines the server which sends the at least two force renew messages is not a false server, and sends a renew message to the server. When the at least two force renew messages cannot be decrypted with the public key or the time stamp of the force renew message received later is not equal to the time stamp of the other force renew message received earlier plus the time difference of the other force renew message received earlier, the client 2 does not send the renew message to the server which sends the at least two force renew messages.

For example, if the at least two force renew messages can be decrypted with the public key corresponding to the private key of the server 1, and the time stamp of the force renew message received earlier is 10000, the time difference of the force renew message received earlier is 20. If the time stamp of the force renew message received later is equal to 10020, the client 2 determines the server which sends the at least two force renew messages is not a false server.

In some embodiments, the client 2 has stored the public key corresponding to the private key of the server 1 in the second storage device 23. In other embodiments, the client 2 can get the public key corresponding to the private key of the server 1 other ways, such as downloading the public key from a specified web site.

The replying module 104 can send a reply message to the client 2 when receiving the renew message from the client 2. When receiving the reply message from the server 1, the client 2 updates the configuration (such as change IP address) according to the reply message.

Referring to FIG. 2, a flowchart is presented in accordance with an example embodiment. The example method 200 is provided by way of example, as there are a variety of ways to carry out the method. The example method 200 described below can be carried out using the configurations illustrated in FIG. 1, for example, and various elements of these figures are referenced in explaining the example method 200. Each block shown in FIG. 2 represents one or more processes, methods, or subroutines, carried out in the example method 200. Furthermore, the illustrated order of blocks is illustrative only and the order of the blocks can be changed. Additional blocks can be added or fewer blocks may be utilized without departing from this disclosure. The example method 200 can begin at block 201.

At block 201, a generating module generates at least two force renew messages in turn when a configuration of Dynamic Host Configuration Protocol (DHCP) of a server is changed. The force renew message includes a time stamp, a time difference, and an identification code of the server. The time stamp of a force renew message is equal to a time stamp of a previous force renew message plus the time difference of the previous force renew message. For example, the time stamp of a first force renew message is 10000, the time difference of the first force renew message is 20. The time stamp of the second force renew message is 10000+20=10020.

In some embodiments, the time difference of each force renew message is not a fixed value. For example, the generating module randomly chooses an integer from a range as the time difference of a force renew message. In other embodiments, the time difference of each force renew message can be a fixed value.

At block 202, an encryption module asymmetrically encrypts the at least two force renew messages with a private key of the server. The private key is stored in a first storage device of the server.

At block 203, a sending module sends the encrypted force renew messages to a client according to a generating order of the force renew messages. In at least one embodiment, the sending module sends the encrypted force renew messages at a regular time interval (such as 100 ms) until receiving a renew message from the client.

It should be noted that the generating module generates two force renew messages the first time. The encryption module asymmetrically encrypts the two force renew messages with the private key of the server. Then the sending module sends the two encrypted force renew messages to the client according to the generating order. If the server does not receive a renew message from the client within a time period (such as 80 ms, the regular time interval is 100 ms) since the second force renew message is sent, the generating module generates a third force renew message. The encryption module asymmetrically encrypts the third force renew message with the private key of the server. Then the sending module sends the third force renew message to the client at the regular time interval.

When at least two force renew messages are received consecutively from a server, the client determines whether the at least two force renew messages are sent by a false server according to the at least two force renew messages. If the server which sends the at least two force renew messages is not a false server, the client sends a renew message to the server.

The client asymmetrically decrypts the at least two force renew messages with a public key corresponding to the private key of the server. If the at least two force renew messages can be decrypted with the public key, the client determines whether the time stamp of the force renew message received later is equal to the time stamp of the force renew message received earlier plus the time difference of the force renew message received earlier. If the time stamp of the force renew message received later is equal to the time stamp of the force renew message received earlier plus the time difference of the force renew message received earlier, the client determines the server which sends the at least two force renew messages is not a false server, and sends a renew message to the server. When the at least two force renew messages cannot be decrypted with the public key or the time stamp of the force renew message received later is not equal to the time stamp of the force renew message received earlier plus the time difference of the force renew message received earlier, the client does not send the renew message to the server which sends the at least two force renew messages.

For example, if the at least two force renew messages can be decrypted with the public key corresponding to the private key of the server, and the time stamp of the force renew message received earlier is 10000, the time difference of the force renew message received earlier is 20. If the time stamp of the force renew message received later is equal to 10020, the client determines the server which sends the at least two force renew messages is not a false server.

In some embodiments, the client has stored the public key corresponding to the private key of the server in a second storage device. In other embodiments, the client can get the public key corresponding to the private key of the server in other ways, such as downloading the public key from a specified web site.

At block 204, a replying module can send a reply message to the client when receiving the renew message from the client. When receiving the reply message from the server, the client updates the configuration (such as change IP address) according to the reply message.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in particular the matters of shape, size and arrangement of parts within the principles of the present disclosure, up to and including the full extent established by the broad general meaning of the terms used in the claims.

What is claimed is:

1. An authentication method based on a time stamp executable by at least one processor of a server, the method comprising:
   generating at least two force renew messages in turn when a configuration of Dynamic Host Configuration Protocol (DHCP) of the server is changed, wherein each generated force renew message comprises a time stamp and a time difference, the time difference of each force renew message is an integer which is chose randomly from a range, and the time stamp of a force renew message is equal to the time stamp of a previous force renew message plus the time difference of the previous force renew message;
   asymmetrically encrypting the at least two force renew messages with a private key of the server;
   sending the encrypted force renew messages to a client device according to a generating order of the force renew messages at a regular time interval until receiving a renew message from the client device; and
   sending a reply message to the client device when receiving the renew message from the client device, wherein the client device sends the renew message when the at least two force renew messages are decrypted with a public key and the time stamp of the force renew message received later is equal to the time stamp of the other force renew message received earlier plus the time difference of the other force renew message received earlier.

2. The method according to claim 1, wherein the time difference of each force renew message is not a fixed value.

3. A server comprising:
   at least one processor;
   a connection device; and
   a storage device that stores one or more programs, when executed by the at least one processor, causes the at least one processor to:
   generate at least two force renew messages in turn when a configuration of Dynamic Host Configuration Protocol (DHCP) of the server is changed, wherein each generated force renew message comprises a time stamp and a time difference, the time difference of each force renew message is an integer which is chose randomly from a range, and the time stamp of a force renew message is equal to the time stamp of a previous force renew message plus the time difference of the previous force renew message;
   asymmetrically encrypt the at least two force renew messages with a private key of the server;
   send the encrypted force renew messages to a client device according to a generating order of the force renew messages through the connection device at a regular time interval until receiving a renew message from the client device; and
   send a reply message to the client device through the connection device when receiving the renew message from the client device, wherein the client device sends the renew message when the at least two force renew messages are decrypted with a public key and the time stamp of the force renew message received later is equal to the time stamp of the other force renew message received earlier plus the time difference of the other force renew message received earlier.

4. The server according to claim 3, wherein the time difference of each force renew message is not a fixed value.

5. A non-transitory storage medium having stored thereon instruction that, when executed by at least one processor of a server, causes the at least one processor to perform an authentication method based on a time stamp, the server comprising a connection device, the method comprising:
   generating at least two force renew messages in turn when a configuration of Dynamic Host Configuration Protocol (DHCP) of the server is changed, wherein each generated force renew message comprises a time stamp and a time difference, the time difference of each force renew message is an integer which is chose randomly from a range, and the time stamp of a force renew message is equal to the time stamp of a previous force renew message plus the time difference of the previous force renew message;

asymmetrically encrypting the at least two force renew messages with a private key of the server;

sending the encrypted force renew messages to a client device according to a generating order of the force renew messages through the connection device at a regular time interval until receiving a renew message from the client device; and sending a reply message to the client device through the connection device when receiving the renew message from the client device, wherein the client device sends the renew message when the at least two force renew messages are decrypted with a public key and the time stamp of the force renew message received later is equal to the time stamp of the other force renew message received earlier plus the time difference of the other force renew message received earlier.

6. The non-transitory storage medium according to claim 5, wherein the time difference of each force renew message is not a fixed value.

* * * * *